(12) United States Patent
Hsu et al.

(10) Patent No.: US 10,331,789 B2
(45) Date of Patent: Jun. 25, 2019

(54) SEMANTIC ANALYSIS APPARATUS, METHOD, AND NON-TRANSITORY COMPUTER READABLE STORAGE MEDIUM THEREOF

(71) Applicant: Institute For Information Industry, Taipei (TW)

(72) Inventors: Yun-Kai Hsu, Taoyuan (TW); Tsung-Chieh Chen, New Taipei (TW); Chih-Li Huo, Kaohsiung (TW); Keng-Wei Hsu, Kinmen County (TW)

(73) Assignee: Institute For Information Industry, Taipei (TW)

( * ) Notice: Subject to any disclaimer, the term of this patent is extended or adjusted under 35 U.S.C. 154(b) by 0 days.

(21) Appl. No.: 15/652,231

(22) Filed: Jul. 17, 2017

(65) Prior Publication Data

US 2018/0365223 A1    Dec. 20, 2018

(30) Foreign Application Priority Data

Jun. 14, 2017  (TW) .............................. 106119812 A (51) Int. Cl.
*G06F 17/27* (2006.01)
*G06N 7/00* (2006.01)
*G06F 17/28* (2006.01)

(52) U.S. Cl.
CPC ...... *G06F 17/2785* (2013.01); *G06F 17/2863* (2013.01); *G06N 7/005* (2013.01)

(58) Field of Classification Search
CPC combination set(s) only.
See application file for complete search history.

(56) References Cited

U.S. PATENT DOCUMENTS 8,478,781 B2 * 7/2013 Tateno .............. G06F 17/30616
                                                    707/780

* cited by examiner

*Primary Examiner* — Abul K Azad
(74) *Attorney, Agent, or Firm* — Skaar Ulbrich Macari, P.A.

(57) ABSTRACT

A semantic analysis apparatus, method, and non-transitory computer readable storage medium thereof are provided. The semantic analysis apparatus performs phrase analysis on a Chinese character string to obtain several groups and semantically analyzes the groups to obtain at least one first probability distribution, wherein each first probability distribution has several first probability values corresponding to several tags one-to-one. The semantic analysis apparatus divides the Chinese character string into several Chinese characters and semantically analyzes the Chinese characters to obtain at least one second probability distribution, wherein each second probability distribution has several second probability values corresponding to the tags one-to-one. The semantic analysis apparatus calculates at least one third probability distribution based on the at least one first probability distribution and the at least one second probability distribution and determines at least one output information of the Chinese character string based on the at least one third probability distribution.

15 Claims, 4 Drawing Sheets

FIG. 1A

| Tag | First probability value |
|---|---|
| find_location | 0.03 |
| reserve_restaurant | 0.02 |
| reserve_hotel_room | 0.01 |
| find_restaurant | 0.05 |
| find_hotel | 0.09 |
| find_route | 0.1 |

100

| Tag | Second probability value |
|---|---|
| find_location | 0.2 |
| reserve_restaurant | 0.4 |
| reserve_hotel_room | 0.5 |
| find_restaurant | 0.95 |
| find_hotel | 0.01 |
| find_route | 0.02 |

102

| Tag | Third probability value |
|---|---|
| find_location | 0.115 |
| reserve_restaurant | 0.21 |
| reserve_hotel_room | 0.255 |
| find_restaurant | 0.5 |
| find_hotel | 0.05 |
| find_route | 0.06 |

| 今天 | 是 | 台灣 | 人民 | 主之日 |
|---|---|---|---|---|
| B.date | O | B.country | B.people | O |

FIG. 2A

| 今 | 天 | 是 | 台 | 灣 | 人 | 民 | 主 | 之 | 日 |
|---|---|---|---|---|---|---|---|---|---|
| B.date | I.date | O | B.nationals | I.nationals | I.nationals | O | O | O | B.date |

FIG. 2B

| 今天 | 是 | 台灣人 | 民主 | 之 | 日 |
|---|---|---|---|---|---|
| B.date | O | B.nationals | O | O | B.date |

SEMANTIC ANALYSIS APPARATUS, METHOD, AND NON-TRANSITORY COMPUTER READABLE STORAGE MEDIUM THEREOF

PRIORITY

This application claims priority to Taiwan Patent Application No. 106119812 filed on Jun. 14, 2017, which is hereby incorporated by reference in its entirety.

FIELD

The present invention relates to a semantic analysis apparatus, method, and non-transitory computer readable storage medium thereof. More particularly, the present invention relates to a Chinese semantic analysis apparatus, method, and non-transitory computer readable storage medium thereof.

BACKGROUND

With the rapid development of technology and the prevailing of social platforms, people tend to provide various kinds of information (e.g., text messages, voice messages) by a variety of input interfaces in their daily life. How to correctly interpret information provided by people so as to provide appropriate responses and/or services based on the interpreted information is an increasingly significant issue in different application fields (e.g., human machine interfaces).

Conventional Chinese semantic analysis technologies may be divided into two categories. While one category utilizes a deep learning network to determine the intention indicated by a Chinese character string, the other category utilizes a keyword analysis technology to label keywords in a Chinese character string. No matter which category of technology is employed, word segmentation needs to be performed on the Chinese character string before the Chinese semantic analysis is performed.

Correctness of conventional Chinese semantic analysis technologies heavily relies on the correctness of the word segmentation. Although many word segmentation technologies are available currently, they have difficulties in handling issues of "ambiguity identification" and "new word identification" when performing word segmentation on a Chinese character string. "Ambiguity identification" means that a Chinese character sting may have more than two word segmentation results. "New word identification" means that the Chinese character string includes words and phrases unregistered, i.e., words and phrases which are not recorded in dictionaries but are actually used. Since the conventional word segmentation technologies cannot deal with the two issues, the result of subsequent Chinese semantic analysis becomes not accurate enough.

Consequently, a semantic analysis technology that reduces the dependence on the word segmentation technology and improves the correctness of semantic analysis is in an urgent need.

SUMMARY

The disclosure includes a semantic analysis apparatus. The semantic analysis apparatus in certain embodiments comprises an input interface, a storage, and a processor electrically connected to the input interface and the storage. The storage stores a plurality of tags. The input interface receives a Chinese character string. The processor performs phrase analysis on the Chinese character string to obtain a plurality of groups and semantically analyzes the groups to obtain at least one first probability distribution, wherein each of the at least one first probability distribution has a plurality of first probability values corresponding to the tags one-to-one. The processor further divides the Chinese character string into a plurality of Chinese characters and semantically analyzes the Chinese characters to obtain at least one second probability distribution, wherein each of the at least one second probability distribution has a plurality of second probability values corresponding to the tags one-to-one. The processor further calculates at least one third probability distribution according to the at least one first probability distribution and the at least one second probability distribution and determines at least one piece of output information of the Chinese character string according to the at least one third probability distribution, wherein the at least one piece of output information is related to one of the tags.

The disclosure also includes a semantic analysis method for an electronic computing apparatus. The semantic analysis method in certain embodiments comprises the following steps of: (a) performing phrase analysis on a Chinese character string to obtain a plurality of groups, (b) dividing the Chinese character string into a plurality of Chinese characters, (c) semantically analyzing the groups to obtain at least one first probability distribution, wherein each of the at least one first probability distribution has a plurality of first probability values corresponding to a plurality of tags one-to-one, (d) semantically analyzing the Chinese characters to obtain at least one second probability distribution, wherein each of the at least one second probability distribution has a plurality of second probability values corresponding to the tags one-to-one, (e) calculating at least one third probability distribution according to the at least one first probability distribution and the at least one second probability distribution, and (f) determining at least one piece of output information of the Chinese character string according to the at least one third probability distribution, wherein the at least one piece of output information is related to one of the tags.

The disclosure further incldues a non-transitory computer readable storage medium, which comprises a computer program stored therein. When the computer program is loaded into an electronic computing apparatus, the computer program executes the semantic analysis method described in the above paragraph.

The semantic analysis technology (including an apparatus, method, and non-transitory computer readable storage medium thereof) adopt a hybrid inference architecture (i.e., semantically analyzing the result of word segmentation on a Chinese character string, and semantically analyzing Chinese characters comprised in the Chinese character string, and then integrating the two semantic analysis results). By the hybrid inference architecture, the semantic analysis technology of the present invention can reduce the dependence on the word segmentation technology, integrate semantic information of the characters, and, hence, generate a more accurate semantic analysis result.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the semantic analysis apparatus, method, and non-transitory computer readable storage medium thereof according to the present invention will be explained with reference to example embodiments thereof. However, these example embodiments are not intended to limit the present invention to any specific example, embodiment, environment, applications, or implementations described in these example embodiments. Therefore, description of these example embodiments is only for purpose of illustration rather than to limit the scope of the present invention.

It shall be appreciated that, in the following embodiments and the attached drawings, elements unrelated to the present invention are omitted from depiction, and dimensions of elements and dimensional relationships among individual elements in the attached drawings are only for the purpose of illustration, but not to limit the scope of the present invention.

Figure 1A:
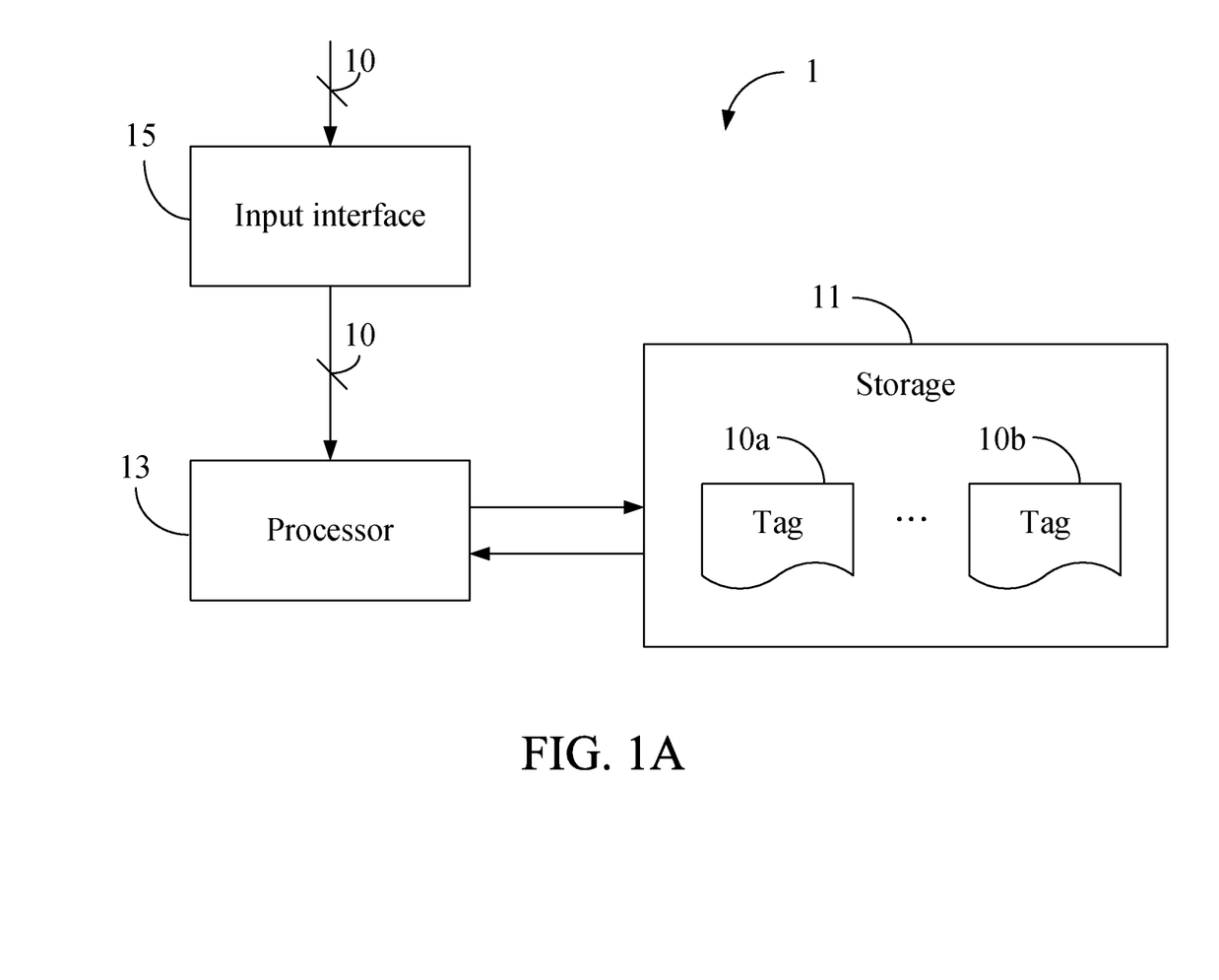
FIG. 1A illustrates a schematic view of the architecture of a semantic analysis apparatus 1 according to a first and a second embodiments.

A first embodiment of the present invention is a semantic analysis apparatus 1, and a schematic view illustrating the architecture thereof is depicted in FIG. 1A. The semantic analysis apparatus 1 comprises a storage 11, a processor 13, and an input interface 15, wherein the processor 13 is electrically connected to the storage 11 and the input interface 15. The storage 11 may be a memory, a Universal Serial Bus (USB) disk, a hard disk, a Compact Disk (CD), a mobile disk, a database, or any other storage media or circuit with the same function and well known to those of ordinary skill in the art. The processor 13 may be any of various processors, Central Processing Units (CPUs), microprocessors, or other computing apparatuses known to those of ordinary skill in the art. The input interface 15 may be any of various apparatuses capable of receiving text information.

The storage 11 stores a plurality of tags $10a, \ldots, 10b$, wherein each of the tags $10a, \ldots, 10b$ corresponds to a meaning. In this embodiment, the semantic analysis apparatus 1 is designed for intention analysis (i.e., analyzing the meaning of a Chinese character string to know the intention/purpose thereof), so each of the tags $10a, \ldots, 10b$ is associated with an intention. For example, the storage 11 may store six tags including "find_location," "reserve_restaurant," "reserve_hotel_room," "find_restaurant," "find_hotel," and "find_route," which respectively correspond to the meanings of "find location," "reserve restaurant," "reserve hotel room," "find restaurant," "find hotel," and "find route."

The input interface 15 receives a Chinese character string 10. It shall be appreciated that the source that the input interface 15 can receive the Chinese character string 10 is not limited in the present invention (e.g., the input interface 15 may receive a Chinese character string inputted by a user from a keyboard or network, may receive a Chinese character string which has been processed by a voice recognition technology, may receive a Chinese character string which has been processed by an image recognition technology, and so on). It shall be appreciated that whether the content of the Chinese character string 10 received by the input interface 15 is correct is not limited in the present invention (e.g., the Chinese character string may include wrong characters).

The processor 13 performs two different segmentations on the Chinese character string 10, performs semantic analysis on the two different segmented results individually, and then integrates the two semantic analysis results.

Herein, the details regarding one of the segmentations and the subsequent semantic analysis are described. Specifically, the processor 13 performs phrase analysis on the Chinese character string 10 and thus obtains a plurality of groups, wherein each of the groups may be a Chinese character or a phrase. The processor 13 may adopt various word segmentation technologies for performing the aforesaid phrase analysis. These word segmentation technologies are well known to those of ordinary skill in the art and, thus, the details of the word segmentation technologies will not be further described herein. For example, the processor 13 may adopt a string matching-based word segmentation technology, a statistics-based word segmentation technology, or an understanding-based word segmentation technology, etc.

Next, the processor 13 semantically analyzes the groups to obtain a first probability distribution. In some embodiments, the processor 13 may convert each of the groups into a vector before performing the semantic analysis. Moreover, in some embodiments, the processor 13 may adopt a deep learning network to semantically analyze the groups to obtain the first probability distribution. It is noted that the first probability distribution has a plurality of first probability values corresponding to the tags $10a, \ldots, 10b$ one-to-one. It shall be appreciated that the aforementioned deep learning network is a technology well known to those of ordinary skill in the art and, thus, the operational details thereof will not be further described herein.

Now, the other segmentation and the subsequent semantic analysis will be described herein. Specifically, the processor 13 divides the Chinese character string 10 into a plurality of Chinese characters (i.e., dividing the Chinese character string 10 in units of Chinese characters). Next, the processor 13 semantically analyzes the Chinese characters to obtain a second probability distribution. In some embodiments, the processor 13 may convert each of the Chinese characters into a vector before performing the semantic analysis. Similarly, in some embodiments, the processor 13 may adopt the deep learning network to semantically analyze the Chinese characters to obtain the second probability distribution. It is noted that the second probability distribution has a plurality of second probability values corresponding to the tags $10a, \ldots, 10b$ one-to-one.

After obtaining the two different semantic analysis results (i.e., the first probability distribution and the second probability distribution), the processor 13 integrates the two semantic analysis results. Specifically, the processor 13 calculates a third probability distribution according to the first probability distribution and the second probability distribution, wherein the third probability distribution has a plurality of third probability values corresponding to the tags $10a, \ldots, 10b$ one-to-one. In some embodiments, the processor 13 may calculate the third probability distribution by averaging the first probability distribution and the second probability distribution. It shall be appreciated that, in those embodiments, the processor 13 averages the first probability value and the second probability value that correspond to the same tag. In some embodiments, the processor 13 may calculate the third probability distribution by weighting the first probability distribution with a first weight value and weighting the second probability distribution with a second weight value. It shall be appreciated that, in those embodiments, the processor 13 performs the weighting operations on the first probability value and the second probability value that correspond to the same tag. Moreover, the processor 13 may adopt the neural network, linear regression, or other similar technologies to perform the aforementioned weighting operations. Moreover, in some embodiments, after weighting the first probability distribution with a first weight value and weighting the second probability distribution with a second weight value, the processor 13 further adds an offset, and the result obtained thereby serves as the third probability distribution.

After integrating the two different semantic analysis results (i.e., after the third probability distribution is calculated), the processor 13 determines a piece of output information according to the third probability distribution. For example, the processor 13 may determine the output information according to the greatest third probability value.

For ease of understanding, a specific example will be described hereby, which, however, is not intended to limit the scope of the present invention. It is assumed that the content of the Chinese character string 10 is "請問餐廳在哪" (meaning "where is the restaurant"). The processor 13 performs phrase analysis on the Chinese character string 10 and thus obtains three groups, namely, "請問" "餐廳" and "在哪." Next, the processor 13 semantically analyzes the three groups (i.e., "請問" "餐廳" and "在哪.") and thus obtains a first probability distribution 100. Please refer to FIG. 1B, which shows the six first probability values comprised in the first probability distribution 100 in this specific example. The six first probability values correspond to the tags 10a, . . . , 10b (i.e., "find_location," "reserve_restaurant," "reserve_hotel_room," "find_restaurant," "find_hotel," and "find_route") one-to-one.

In addition, the processor 13 divides the Chinese character string 10 into a plurality of Chinese characters, namely, "請," "問," "餐," "廳," "在," and "哪." Next, the processor 13 semantically analyzes the six Chinese characters and thus obtains a second probability distribution 102. Please refer to FIG. 1B for the six second probability values comprised in the second probability distribution 102 in this specific example. The six second probability values correspond to the tags 10a, . . . , 10b (i.e., "find_location," "reserve_restaurant," "reserve_hotel_room," "find_restaurant," "find_hotel," and "find_route") one-to-one.

Figure 1B:
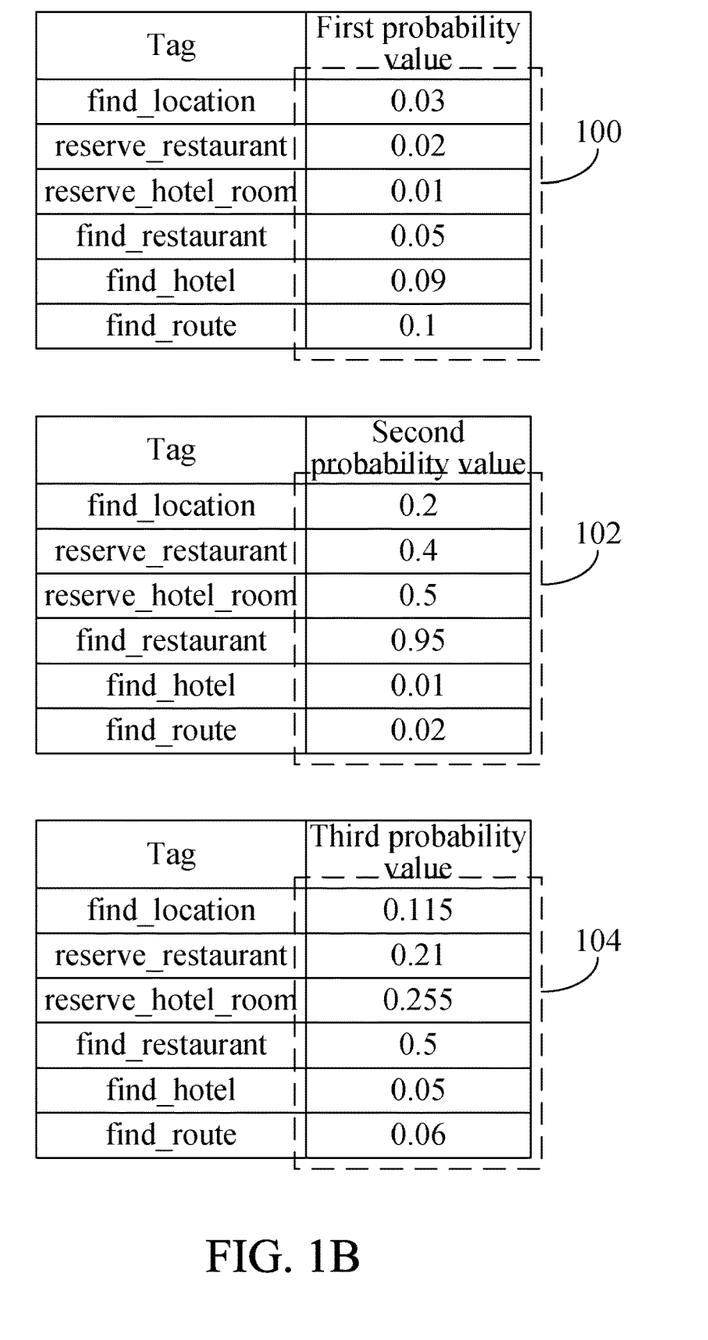
FIG. 1B illustrates specific examples of a first probability distribution, a second probability distribution, and a third probability distribution.

From FIG. 1B, it is learned that the greatest first probability value in the first probability distribution 100 corresponds to the tag of "find_route" (which is a wrong semantic analysis result), and the greatest second probability values in the second probability distribution 102 corresponds to the tag of "find_restaurant" (which is a correct semantic analysis result). Since the processor 13 will integrate the first probability distribution of the groups with the second probability distribution of the Chinese characters to generate a third probability distribution, the semantic analysis results can be rectified by integrating the first probability distribution with the second probability distribution no matter whether the semantic analysis result represented by the first probability distribution is correct or not. In other words, considering that semantic analysis on the Chinse characters of the Chinese character string 10 tends to generate a correct semantic analysis result but each Chinese character has less meaning than phrase(s), the processor 13 integrates the two semantic analysis results.

For example, in this specific example, the processor 13 obtains a third probability distribution 104 by averaging the first probability distribution 100 and the second probability distribution 102. As shown in FIG. 1B, the third probability distribution 104 comprises six third probability values, wherein the six third probability values correspond to the tags 10a, . . . , 10b (i.e., "find_location," "reserve_restaurant," "reserve_hotel_room," "find_restaurant," "find_hotel," and "find_route") one-to-one. As shown in FIG. 1B, the third probability value that corresponds to the tag "find_restaurant" is the greatest third probability value. The processor 13 determines the output information based on the greatest third probability value. For example, the output information may be the meaning corresponding to the tag that corresponds to the greatest third probability value (i.e., "find restaurant").

According to the above descriptions, the semantic analysis apparatus 1 of the first embodiment performs two different segmentations on the Chinese character string 10 (i.e., dividing the Chinese character string 10 into a plurality of groups via a word segmentation technology and dividing the Chinese character string 10 into a plurality of Chinese characters), semantically analyzes each of the two segmented results, and then integrates the two semantic analysis results to understand the intention/meaning of the Chinese character string 10. Since the semantic analysis apparatus 1 integrates the semantic analysis result that is more specific (i.e., the semantic analysis result of the Chinese characters) with the semantic analysis result which is performed based on phrase characteristics (i.e., the semantic analysis result of the groups), erroneous semantic analysis caused by erroneous word segmentation or erroneous recognition of the Chinese character string can be avoided. Moreover, since semantic analysis on the Chinese character string based on the Chinese characters is adopted, the present invention is able to handle issues such as "ambiguity identification" and "new word identification," which cannot be handled in the prior art. Thereby, the present invention generates a more accurate semantic analysis result and determines the intention/meaning of the Chinese character string 10 more accurately.

Please refer to FIG. 1A, FIG. 2A, FIG. 2B, and FIG. 2C for a second embodiment of the present invention. In this embodiment, the processor 13 performs two different segmentations on the Chinese character string 10, semantically analyzes the two different segmented result individually, and then integrates two semantic analysis results. It shall be appreciated that the processor 13 performs the two different segmentations on the Chinese character string 10 through the same technology as described in the first embodiment (i.e., dividing the Chinese character string 10 into a plurality of groups and dividing the Chinese character string 10 into a plurality of Chinese characters) and, hence, the details will not be further described herein. In the following descriptions, only the differences between this embodiment and the first embodiment will be detailed.

In this embodiment, the semantic analysis apparatus 1 is designed for keyword analysis (i.e., analyzing the Chinese character string 10 to identify possible keywords/phrases therein). To achieve the aforesaid analysis, the tags 10a, . . . , 10b stored in the storage 11 include a blank tag (for corresponding to a group or a Chinese character with no practical meaning and new words that cannot correspond to other tags, e.g., conjunctions such as "是" (which means is), "之" (which means of) and "也" (which means also)) and a plurality of tags showing literal meaning attributes. For example, the storage 11 may store seven tags, including "O", "B.date," "I.date," "B.nationals," "I.nationals," "B.people," and "B.country." The tag "O" represents a "blank tag," while the remaining six tags are tags having literal meanings. Each of the aforesaid six tags having literal meanings includes two parts, wherein the first part represents the order and the second part represents the literal meaning. Specifically, in the six tags (i.e., "B.date," "I.date," "B.nationals," "I.nationals," "B.people," and "B.country"), the "B" represents that the order is the start, the "I" represents that the order is not the start, the "date" represents the date, the "nationals" represents the nationality, the "people" represents the people, and the "country" represents the country. It shall be appreciated that "B" and "I" in the tags are referred to by the processor 13 in determining the order of the groups or the Chinese characters, which will not influence the output result.

In this embodiment, the processor 13 obtains a plurality of first probability distributions after semantically analyzing the groups obtained through the phrase analysis. The first probability distributions correspond to the groups one-to-one (i.e., one group corresponds to one first probability distribution), and each of the first probability distributions has a plurality of first probability values corresponding to the tags 10a, . . . , 10b one-to-one. Moreover, the processor 13 obtains a plurality of second probability distributions after semantically analyzing the Chinese characters obtained through the dividing operation. The second probability distributions correspond to the Chinese characters one-to-one (i.e., one Chinese character corresponds to one second probability distribution), and each of the second probability distributions has a plurality of second probability values corresponding to the tags 10a, . . . , 10b one-to-one.

After obtaining the two different semantic analysis results (i.e., the first probability distributions and the second probability distributions), the processor 13 integrates the two semantic analysis results (i.e., the processor 13 calculates a plurality of third probability distributions according to the first probability distributions and the second probability distributions, and each of the third probability distributions has a plurality of third probability values corresponding to the tags 10a, . . . , 10b one-to-one). Specifically, the processor 13 performs the following operations on each of the Chinese characters: (a) selecting one of the groups as a selected group according to the Chinese character, wherein the selected group includes the Chinese character and (b) calculating a corrected probability distribution of the Chinese character according to the second probability distribution corresponding to the Chinese character and the first probability distribution corresponding to the selected group, wherein the corrected probability distribution is one of the third probability distributions.

In some embodiments, the processor 13 calculates the third probability distributions by averaging the first probability distribution and the second probability distribution that correspond to each other (i.e., the second probability distribution of a certain Chinese character and the first probability distribution of the group including the Chinese character). It shall be appreciated that, in these embodiments, the processor 13 averages the first probability value and the second probability value that correspond to the same tag. Additionally, in some embodiments, for the first probability distribution and the second probability distribution that correspond to each other (i.e., the second probability distribution of a certain Chinese character and the first probability distribution of the group including the Chinese character), the processor 13 performs weighting operations thereon respectively with a first weight value and a second weight value, and even adds a deviation value (optionally), thereby calculating the third probability distributions. It shall be appreciated that, in these embodiments, the processor 13 performs the weighting operations on the first probability value and the second probability value that correspond to the same tag. Additionally, the processor 13 may adopt the neural network, the linear regression, or other similar technologies to perform the aforesaid weighting operations.

After integrating the two different semantic analysis results (i.e., after the third probability distributions are calculated), the processor 13 determines a plurality of pieces of output information of the Chinese character string 10 according to the third probability distributions. Specifically, for each of the Chinese characters, the processor 13 determines the output information corresponding to the Chinese character according to the third probability values included in the corrected probability distribution (which is one of the third probability distributions) corresponding to the Chinese character. For example, for each of the Chinese characters, the processor 13 may determine the output information of the Chinese character according to the greatest third probability value in the corrected probability distribution corresponding to the Chinese character.

For ease of understanding, a specific example will be described hereby, which, however, is not intended to limit the scope of the present invention. It is assumed that the content of the Chinese character string 10 is "今天是台灣人民主之日." It is also assumed that the storage 11 stores seven tags including "O", "B.date," "I.date," "B.nationals," "I.nationals," "B.people," and "B.country," wherein the meaning represented by each of the tags is as described above.

Figure 2A:
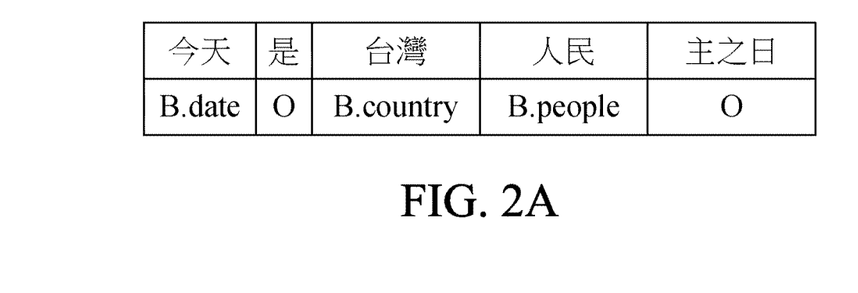
FIG. 2A depicts a plurality of groups and the tag corresponding to the greatest first probability value corresponding to each of the groups in a specific exemplary example.

In this specific example, the processor 13 performs phrase analysis on the Chinese character string 10 to obtain five groups (including "今天," "是," "台灣," "人民," and "主之 日" as shown in FIG. 2A). The processor 13 semantically analyzes the five groups (i.e., "今 天 ," "是," "台灣," "人民," and "主之口") and thus obtains five first probability distributions. These five first probability distributions correspond to the aforementioned five groups one-to-one, wherein each of the first probability distributions has seven first probability values corresponding to the aforementioned seven tags one-to-one. Please refer to FIG. 2A, for each group, the tag corresponding to the greatest first probability value in the first probability distribution that corresponds to the group is shown, e.g., the greatest first probability value in the first probability distribution corresponding to the group "今天" corresponds to the tag "B.date." It shall be appreciated that if the conventional technology is adopted, the output information is the correspondence relationships shown in FIG. 2A.

Figure 2B:
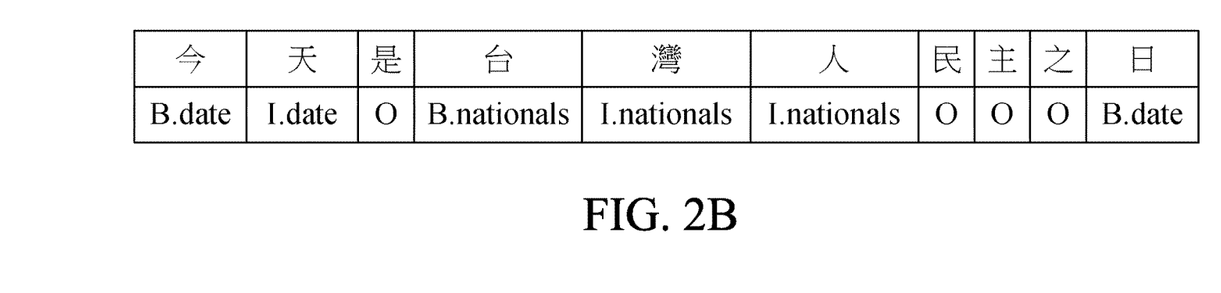
FIG. 2B depicts a plurality of Chinese characters and the tag corresponding to the greatest second probability value corresponding to each of the Chinese characters in a specific exemplary example.

In addition, the processor 13 divides the Chinese character string 10 into ten Chinese characters (including "今," "天 ," "是," "台 ," "灣 ," "人 ," "民 ," "主 ," "之 ," and "日" as shown in FIG. 2B). Next, the processor 13 semantically analyzes the ten Chinese characters and thus obtains ten second probability distributions. These ten second probability distributions correspond to the aforesaid ten Chinese characters one-to-one, and each of the second probability distributions has seven second probability values corresponding to the aforesaid seven tags one-to-one. FIG. 2B also depicts the tag corresponding to the greatest second probability value in the second probability distribution that corresponds to each Chinese character, e.g., the greatest second probability value in the second probability distribution corresponding to the Chinese character "今" corresponds to the tag "B.date." It shall be appreciated that if the conventional technology is adopted, the output information is the correspondence relationships shown in FIG. 2B.

In this specific example, after obtaining the two different semantic analysis results (i.e., the first probability distributions and the second probability distributions), the processor 13 calculates a plurality of third probability distributions (e.g., averaging the first probability distribution and the second probability distribution) according to the first probability distribution and the second probability distribution that correspond to each other (i.e., the second probability distribution of a certain Chinese character and the first probability distribution of the group including the Chinese character). Taking the Chinese character "今" as an example, the group "今天" corresponds to the Chinese character "今" (because the group "今天" includes the Chinese character "今"). The processor 13 calculates a third probability distribution by averaging the second probability distribution corresponding to the Chinese character "今" and the first probability distribution corresponding to the group "今天," wherein the third probability distribution may be regarded as the corrected probability distribution of the Chinese character "今." The processor 13 performs the same operations on the rest Chinese characters, thereby obtaining other third probability distributions (i.e., the corrected probability distributions of the rest Chinese characters).

In this specific example, after calculating all the third probability distributions (i.e., the corrected probability distributions of all the Chinese characters), the processor 13 determines a piece of output information according to each of the third probability distributions. For example, for each of the Chinese characters, the processor 13 takes the tag corresponding to the greatest third probability value in the third probability distribution that corresponds to the Chinese character as the output information. Thereafter, the processor 13 may integrate these pieces of output information as shown in FIG. 2C.

Figure 2C:
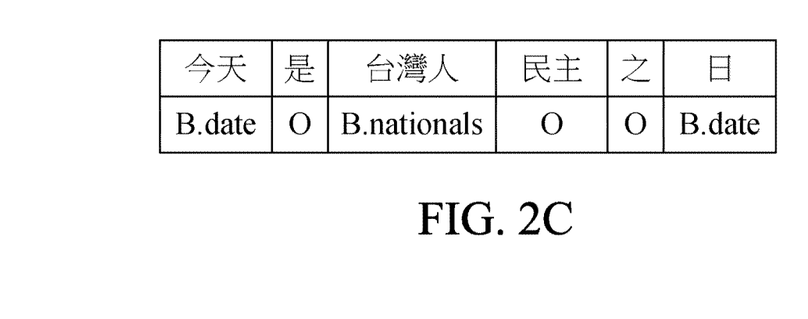
FIG. 2C depicts a specific exemplary example of output information obtained after integrating the semantic analysis result of the groups with the semantic analysis result of the Chinese characters.

Please Refer to FIG. 2A, FIG. 2B, and FIG. 2C together. In FIG. 2A, the greatest first probability value in the first probability distribution corresponding to the group "台灣" corresponds to the tag "B.country" and the greatest first probability value in the first probability distribution corresponding to the group "人民" corresponds to the tag "B.people." In FIG. 2B, the greatest second probability value in the second probability distribution corresponding to the Chinese character "台" corresponds to the tag "B.nationals," the greatest second probability value in the second probability distribution corresponding to the Chinese character "灣" corresponds to the tag "I.nationals," and the greatest second probability value in the second probability distribution corresponding to the Chinese character "人" corresponds to the tag "I.nationals." As described previously, the processor 13 calculates the third probability distributions of the Chinese characters "台," "灣," and "人." According to the calculated data, the greatest third probability value in the third probability distribution corresponding to the Chinese character "台" corresponds to the tag "B.nationals," the greatest third probability value in the third probability distribution corresponding to the Chinese character "灣" corresponds to the tag "B.nationals," and the greatest third probability value in the third probability distribution corresponding to the Chinese character "人" corresponds to the tag "B.nationals." Since these three Chinese characters are adjacent ones in the Chinese character string and the tags corresponding to the greatest third probability values of these three Chinese characters have the same literal meaning, the processor 13 integrates these three Chinese characters into a phrase as shown in FIG. 2C.

According to the above descriptions, in the second embodiment, the processor 13 performs two segmentations on the Chinese character string 10, semantically analyzes each of the segmented results, and obtains the literal meaning/order of each of the groups and Chinese characters. Thereafter, the processor 13 integrates the two semantic analysis results to correct the tag corresponding to each of the Chinese characters. Furthermore, the processor 13 integrates some Chinese characters into a phrase according to the literal meanings of the tags corresponding to the Chinese characters. Therefore, this embodiment is able to analyze keywords included in the Chinese character string 10. Moreover, since two semantic analysis results are integrated, the issues such as "ambiguity identification" and "new word identification" that cannot be handled in the prior art can be handled in this embodiment. In addition, this embodiment can more accurately determine the phrases/keywords included in the Chinese character string 10 and the literal meanings thereof.

Figure 3:
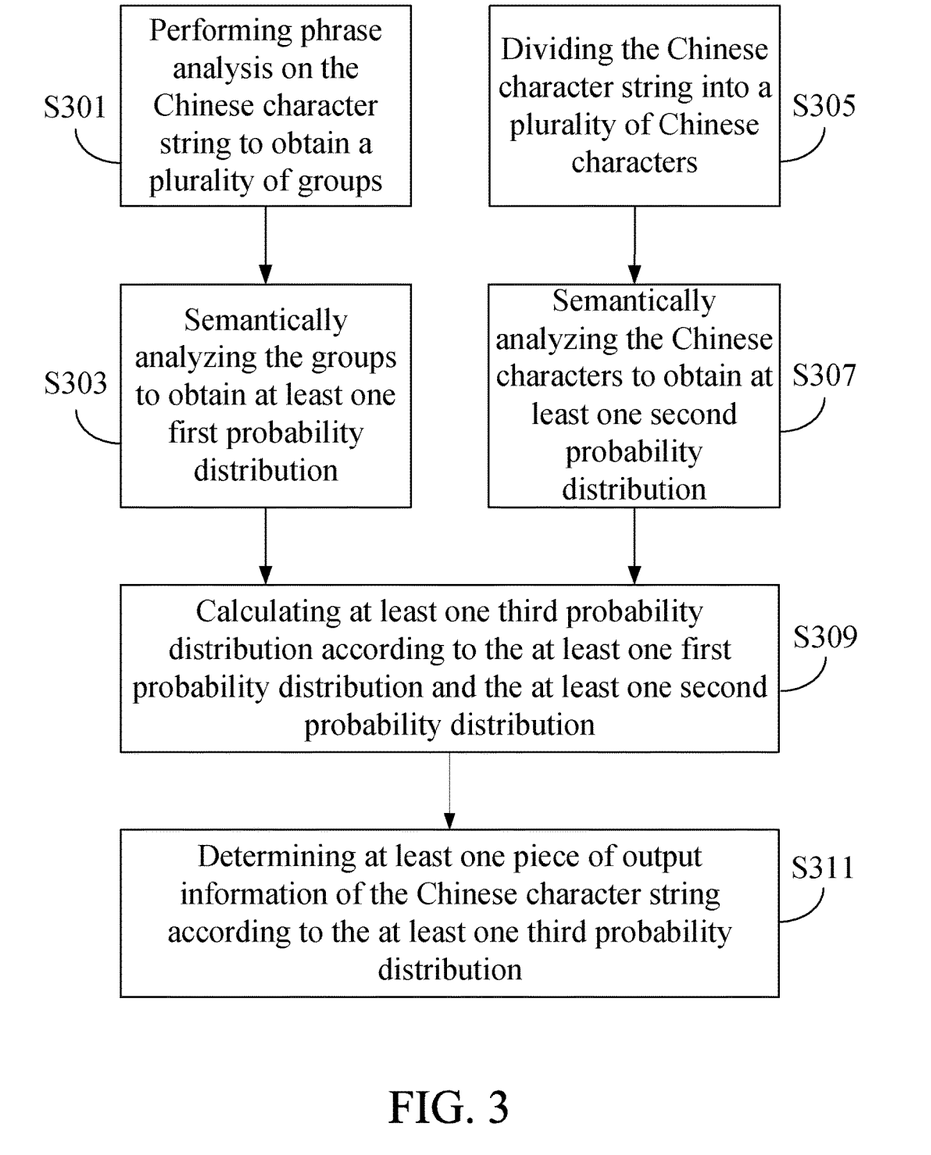
FIG. 3 is a flowchart diagram depicting a semantic analysis method according to a third embodiment.

A third embodiment of the present invention is a semantic analysis method, wherein a flowchart thereof is depicted in FIG. 3. The semantic analysis method is used for an electronic computing apparatus (e.g., the semantic analysis apparatus 1 of the first embodiment). In this embodiment, the electronic computing apparatus has received a Chinese character string.

In step S301, the electronic computing apparatus performs phrase analysis on the Chinese character string to obtain a plurality of groups, wherein each of the groups may include a Chinese character or a phrase. Next, in step S303, the electronic computing apparatus semantically analyzes the groups to obtain at least one first probability distribution, wherein each of the at least one first probability distribution has a plurality of first probability values corresponding to a plurality of tags one-to-one. In addition, in step S305, the electronic computing apparatus divides the Chinese character string into a plurality of Chinese characters. Next, in step S307, the electronic computing apparatus semantically analyzes the Chinese characters to obtain at least one second probability distribution, wherein each of the at least one second probability distribution has a plurality of second probability values corresponding to the tags one-to-one. It shall be appreciated that, according to the technology of the present invention, the order in which the steps are executed is not limited as long as the step S301 is executed before the step S303 and the step S305 is executed before the step S307.

Next, in step S309, the electronic computing apparatus calculates at least one third probability distribution according to the at least one first probability distribution and the at least one second probability distribution. Thereafter, in step S311, the electronic computing apparatus determines at least one piece of output information of the Chinese character string according to the at least one third probability distribution, wherein the at least one piece of output information is related to one of the tags.

It shall be appreciated that, in some embodiments, the step S303 obtains a first probability distribution after semantically analyzing the groups, the step S307 obtains a second probability distribution after semantically analyzing the Chinese characters, and the step S309 calculates a third probability distribution according to the first probability distribution and the second probability distribution, wherein the third probability distribution has a plurality of third probability values corresponding to the tags one-to-one. For example, the step S309 may calculate the third probability distribution by averaging the first probability value and the second probability value that correspond to the same tag. As another example, the step S309 may calculate the third probability distribution by weighting the first probability distribution with a first weight value and weighting the second probability distribution with a second weight value, and even adding an offset (optionally), wherein the obtained result is the third probability distribution. In these embodiments, the step S311 may determine a piece of output information based on the greatest third probability value of the third probability distribution.

It shall be appreciated that, in some embodiments, the step S303 obtains a plurality of first probability distributions after semantically analyzing the groups, the step S307 obtains a plurality of second probability distributions after semantically analyzing the Chinese characters, and the step S309 calculates a plurality of third probability distributions according to the first probability distributions and the second probability distributions. It shall be appreciated that the groups correspond to the first probability distributions one-to-one, and the Chinese characters correspond to the second probability distributions one-to-one. The step S309 performs the following operations on each of the Chinese characters: (1) selecting one of the groups as a selected group according to the Chinese character, wherein the selected group includes the Chinese character and (2) calculating a corrected probability distribution of the Chinese character according to the second probability distribution corresponding to the Chinese character and the first probability distribution corresponding to the selected group, wherein the corrected probability distribution is one of the third probability distributions. Thereafter, the step S311 determines one of the plurality of pieces of output information according to the corrected probability distribution (i.e., one of the third probability distributions) corresponding to each of the Chinese characters.

In addition to the aforesaid steps, the third embodiment can also execute all the operations and steps set forth in the first and second embodiments, have the same functions, and deliver the same technical effects as the first and second embodiments. How the third embodiment executes these operations and steps, has the same functions, and delivers the same technical effects as the first and second embodiments will be readily appreciated by those of ordinary skill in the art based on the explanation of the first and second embodiments, and thus will not be further described herein.

The semantic analysis method described in the third embodiment may be implemented by a computer program having a plurality of codes. The computer program is stored in a non-transitory computer readable storage medium. When the computer program is loaded into an electronic computing apparatus (e.g., semantic analysis apparatus 1), the computer program executes the semantic analysis method as described in the third embodiment. The non-transitory computer readable storage medium may be an electronic product, e.g., a read only memory (ROM), a flash memory, a floppy disk, a hard disk, a compact disk (CD), a mobile disk, a database accessible to networks, or any other storage media with the same function and well known to those of ordinary skill in the art.

It shall be appreciated that, in the specification of the present invention, terms "first," "second," and "third" used in the first probability distribution, the second probability distribution, and the third probability distribution are only used to mean that these probability distributions are different probability distributions. The terms "first," "second," and "third" used in the first probability value, the second probability value, and the third probability value are only used to mean that these probability values are probability values in different probability distributions.

According to the above descriptions, the semantic analysis technology (including the apparatus, method, and non-transitory computer readable storage medium thereof) according to the present invention performs two different segmentations on a Chinese character string (i.e., performing phrase analysis on the Chinese character string to obtain a plurality of groups, and dividing the Chinese character string in units of Chinese characters to obtain a plurality of Chinese characters), semantically analyzes each of the segmented results to obtain at least one first probability distribution and at least one second probability distribution, integrates the at least one first probability distribution and at least one second probability distribution into at least one third probability distribution, and then determines the output information according to the at least one third probability distribution. Since the semantic analysis technology (including the apparatus, method, and non-transitory computer readable storage medium thereof) according to the present invention integrates the semantic analysis result of the Chinese characters with the semantic analysis result of the groups (the semantic analysis result obtained by analyzing based on phrase characteristics), issues such as "ambiguity identification" and "new word identification" that cannot be handled in the prior art can be handled by the present invention, and erroneous semantic analysis caused by erroneous word segmentation or erroneous recognition of the Chinese character string in the prior art can be avoided.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A semantic analysis apparatus, comprising:
an input interface, being configured to receive a Chinese character string;
a storage, being configured to store a plurality of tags; and
a processor, being electrically connected to the input interface and the storage and configured to perform phrase analysis on the Chinese character string to obtain a plurality of groups, divide the Chinese character string into a plurality of Chinese characters, and semantically analyze the groups to obtain at least one first probability distribution, wherein each of the at least one first probability distribution has a plurality of first probability values corresponding to the tags one-to-one,
wherein the processor further semantically analyzes the Chinese characters to obtain at least one second probability distribution, each of the at least one second probability distribution has a plurality of second probability values corresponding to the tags one-to-one, and the processor further calculates at least one third probability distribution according to the at least one first probability distribution and the at least one second probability distribution and determines at least one piece of output information of the Chinese character string according to the at least one third probability distribution, wherein the at least one piece of output information is related to one of the tags, wherein each of the at least one third probability distribution has a plurality of third probability values corresponding to the tags one-to-one, and wherein the processor determines the at least one piece of output information based on the greatest third probability value of each of the at least one third probability distribution.

2. The semantic analysis apparatus of claim 1, wherein the processor semantically analyzes the groups to obtain a plurality of first probability distributions, semantically analyzes the Chinese characters to obtain a plurality of second probability distributions, calculates a plurality of third probability distributions according to the first probability distributions and the second probability distributions, and determines a plurality of pieces of output information of the Chinese character string according to the third probability distributions.

3. The semantic analysis apparatus of claim 2, wherein the groups correspond to the first probability distributions one-to-one, the Chinese characters correspond to the second probability distributions one-to-one, and the processor performs the following operations on each of the Chinese characters: (a) selecting one of the groups as a selected group according to the Chinese character, wherein the selected group includes the Chinese character, (b) calculating a corrected probability distribution of the Chinese character according to the second probability distribution corresponding to the Chinese character and the first probability distribution corresponding to the selected group, wherein the corrected probability distribution is one of the third probability distributions, and (c) determining one of the plurality of pieces of output information according to the corrected probability distribution.

4. The semantic analysis apparatus of claim 1, wherein the processor calculates the at least one third probability distribution by weighting the at least one first probability distribution with a first weight value and weighting the at least one second probability distribution with a second weight value.

5. The semantic analysis apparatus of claim 1, wherein the processor calculates the at least one third probability distribution by averaging the at least one first probability distribution and the at least one second probability distribution.

6. A semantic analysis method for an electronic computing apparatus, comprising:
(a) performing phrase analysis on a Chinese character string to obtain a plurality of groups;
(b) dividing the Chinese character string into a plurality of Chinese characters;
(c) semantically analyzing the groups to obtain at least one first probability distribution, wherein each of the at least one first probability distribution has a plurality of first probability values corresponding to a plurality of tags one-to-one;
(d) semantically analyzing the Chinese characters to obtain at least one second probability distribution, wherein each of the at least one second probability distribution has a plurality of second probability values corresponding to the tags one-to-one;

(e) calculating at least one third probability distribution according to the at least one first probability distribution and the at least one second probability distribution; and (f) determining at least one piece of output information of the Chinese character string according to the at least one third probability distribution, wherein the at least one piece of output information is related to one of the tags, wherein each of the at least one third probability distribution has a plurality of third probability values corresponding to the tags one-to-one, and wherein the step (f) determines the at least one piece of output information based on the greatest third probability value of each of the at least one third probability distribution.

7. The semantic analysis method of claim 6, wherein the step (c) semantically analyzes the groups to obtain a plurality of first probability distributions, the step (d) semantically analyzes the Chinese characters to obtain a plurality of second probability distributions, the step (e) calculates a plurality of third probability distributions according to the first probability distributions and the second probability distributions, and the step (f) determines a plurality of pieces of output information of the Chinese character string according to the third probability distributions.

8. The semantic analysis method of claim 7, wherein the groups correspond to the first probability distributions one-to-one, the Chinese characters correspond to the second probability distributions one-to-one, and the step (e) performs the following operations on each of the Chinese characters:
(e1) selecting one of the groups as a selected group according to the Chinese character, wherein the selected group includes the Chinese character; and
(e2) calculating a corrected probability distribution of the Chinese character according to the second probability distribution corresponding to the Chinese character and the first probability distribution corresponding to the selected group, wherein the corrected probability distribution is one of the third probability distributions, wherein the step (f) performs the following step on each of the Chinese characters: determining one of the plurality of pieces of output information according to the corrected probability distribution corresponding to the Chinese character.

9. The semantic analysis method of claim 6, wherein the step (e) calculates the at least one third probability distribution by weighting the at least one first probability distribution with a first weight value and weighting the at least one second probability distribution with a second weight value.

10. The semantic analysis method of claim 6, wherein the step (e) calculates the at least one third probability distribution by averaging the at least one first probability distribution and the at least one second probability distribution.

11. A non-transitory computer readable storage medium, having a computer program stored therein, the computer program executing a semantic analysis method after being loaded into an electronic computing apparatus, the semantic analysis method comprising:
(a) performing phrase analysis on a Chinese character string to obtain a plurality of groups;
(b) dividing the Chinese character string into a plurality of Chinese characters;
(c) semantically analyzing the groups to obtain at least one first probability distribution, wherein each of the at least one first probability distribution has a plurality of first probability values corresponding to a plurality of tags one-to-one;

(d) semantically analyzing the Chinese characters to obtain at least one second probability distribution, wherein each of the at least one second probability distribution has a plurality of second probability values corresponding to the tags one-to-one;

(e) calculating at least one third probability distribution according to the at least one first probability distribution and the at least one second probability distribution; and (f) determining at least one piece of output information of the Chinese character string according to the at least one third probability distribution, wherein the at least one piece of output information is related to one of the tags, wherein each of the at least one third probability distribution has a plurality of third probability values corresponding to the tags one-to-one, and wherein the step (f) determines the at least one piece of output information based on the greatest third probability value of each of the at least one third probability distribution.

12. The non-transitory computer readable storage medium of claim 11, wherein the step (c) semantically analyzes the groups to obtain a plurality of first probability distributions, the step (d) semantically analyzes the Chinese characters to obtain a plurality of second probability distributions, the step (e) calculates a plurality of third probability distributions according to the first probability distributions and the second probability distributions, and the step (f) determines a plurality of pieces of output information of the Chinese character string according to the third probability distributions.

13. The non-transitory computer readable storage medium of claim 12, wherein the groups correspond to the first probability distributions one-to-one, the Chinese characters correspond to the second probability distributions one-to-one, and the step (e) performs the following operations on each of the Chinese characters:

(e1) selecting one of the groups as a selected group according to the Chinese character, wherein the selected group includes the Chinese character; and (e2) calculating a corrected probability distribution of the Chinese character according to the second probability distribution corresponding to the Chinese character and the first probability distribution corresponding to the selected group, wherein the corrected probability distribution is one of the third probability distributions, wherein the step (f) performs the following step on each of the Chinese characters: determining one of the plurality of pieces of output information according to the corrected probability distribution corresponding to the Chinese character.

14. The non-transitory computer readable storage medium of claim 11, wherein the step (e) calculates the at least one third probability distribution by weighting the at least one first probability distribution with a first weight value and weighting the at least one second probability distribution with a second weight value.

15. The non-transitory computer readable storage medium of claim 11, wherein the step (e) calculate the at least one third probability distribution by averaging the at least one first probability distribution and the at least one second probability distribution.

* * * * *